Patented Sept. 24, 1935

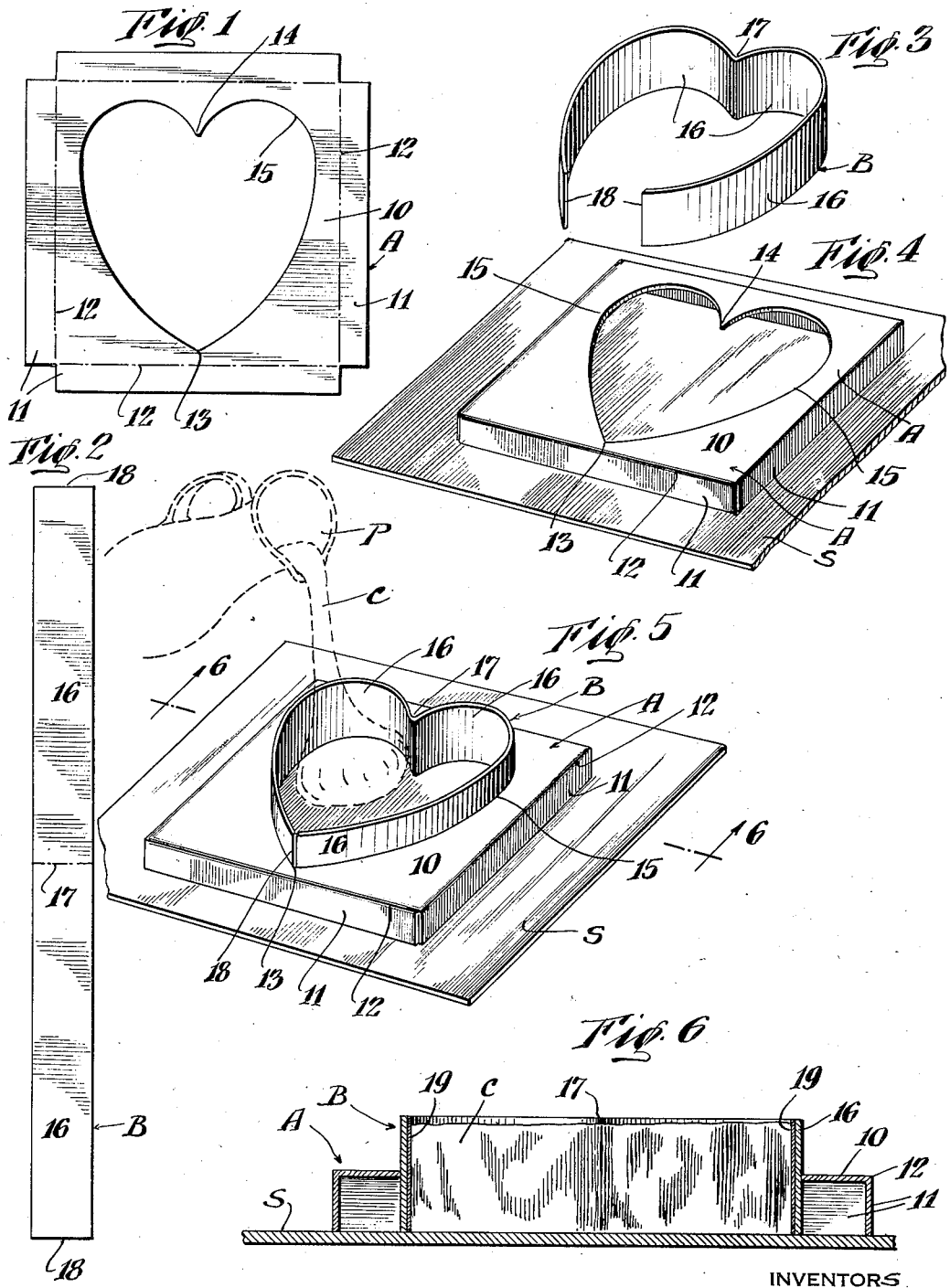

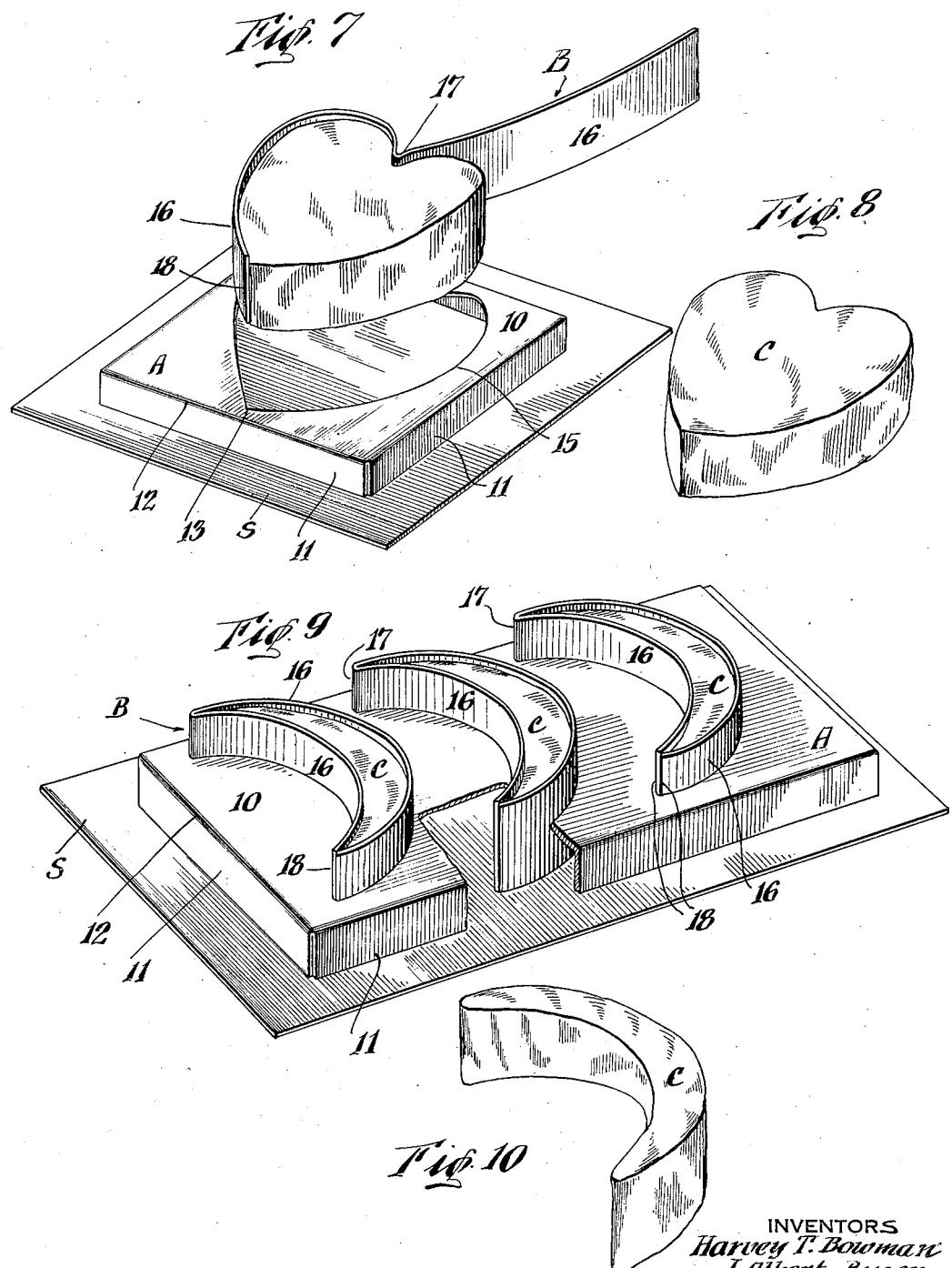

2,015,097

UNITED STATES PATENT OFFICE 2,015,097

METHOD AND APPARATUS FOR SHAPING EDIBLE PRODUCTS

Harvey T. Bowman and John Albert Buser, Lebanon, Pa., assignors to Mitre Box Corporation, Lebanon, Pa., a corporation of Pennsylvania Application March 13, 1933, Serial No. 660,450

5 Claims. (Cl. 107—19)

This invention relates to a method and apparatus for shaping edible products and more particularly to a method and means for forming edible goods into a variety of attractive shapes and contours during the forming or solidifying operation.

It is often desired for banquets, dinners, picnics and other occasions to provide edible products such as cakes, pies, pastries, puddings, baked goods, cooked products, frozen creams, icings, gelatines, etc., in unusual shapes and patterns. The formation of special shapes of these edible products has heretofore been accomplished by the use of trays or pans having the desired irregular contour. The raw edible material is placed in the pan and the product then solidified by baking, cooling or processing, when it assumes the desired shape and form. A large assortment of relatively expensive metallic or glazed trays and other equipment have heretofore been required to produce these irregular shapes and contours. Difficulty has also been experienced in removing the contents from the tray or pan without breaking or injuring the finished product.

An object of this invention is to provide an apparatus with which a large variety of different shaped edible products can be quickly and inexpensively made.

Another object of this invention is to provide an apparatus by which edible products may be given artistic forms and from which the finished product may be quickly and effectively removed without injury or defacement to the most delicate products.

Another object of this invention is to provide an apparatus in which heart-shaped, crescent-shaped, arcuate and irregular contoured products can be made and formed during the solidification of the raw product from the plastic to the solid state, the apparatus being inexpensive in first cost, durable and lasting in use, which can be quickly and thoroughly cleaned, set up for use and disassembled with a minimum of labor, which can be stored in little space, and which is generally practical and efficient for the purpose for which it is designed.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a face view of a blank from which the base member of the apparatus may be formed;

Fig. 2 is an extended side view of a strip which can be shaped into the desired container form and placed within the base member shown in Fig. 1;

Fig. 3 is a perspective view of the container forming strip shown in Fig. 2 bent into generally heart-shaped contour;

Fig. 4 is a perspective view of the base member formed from the blank shown in Fig. 1, the base member being shown in position upon a flat surface ready to receive the container forming strip shown in Fig. 3;

Fig. 5 is a perspective view of the set up apparatus with the liquid or plastic product being poured therein;

Fig. 6 is a vertical cross sectional view through the apparatus, this view being taken on line 6—6 of Fig. 5;

Fig. 7 is a perspective view of the finished product and container forming strip removed from the base member, the container forming strip being shown in the process of being peeled or removed from the finished baked product;

Fig. 8 is a perspective view of the finished product which has been given a heart-shaped contour;

Fig. 9 is a perspective view of a similar apparatus for forming crescent-shaped products, this view being intended to suggest and illustrate the variety of different shapes and forms which can be made from the apparatus as herein disclosed; and Fig. 10 is a perspective view of a finished crescent-shaped product made from the method and apparatus herein disclosed.

Similar reference characters refer to similar parts through the several views of the drawings and specification.

The novel apparatus for giving edible products unusual shapes comprises generally a base member A formed from the blank shown in Fig. 1. The base member is provided with an opening within which a strip of sheet material is positioned, the strip following closely the contour of the opening. The strip forms in effect the side walls of the container within which the product is formed. The base member and strip may be placed upon a flat surface S which may be heated to bake the material or cooled to solidify the raw material.

For the purpose of illustration, there is shown in Figure 1 a base forming blank A which comprises a horizontal top wall 10 and surrounding and supporting side walls 11 which may be bent along the lines 12 into substantially vertical position. The top horizontal wall 10 of the base member is provided with a cutout opening which in the particular instance is in the form of a heart having a point 13, a valley 14 and arcuate side portions 15. It is understood that an opening of any form or shape desired may be provided.

A simple strip or band B, such as shown in Figure 2, is inserted within the cut out opening in the base member. The strip is preferably made of resilient material and may comprise the side wall portions 16 divided by a line of division 17. In the case of a heart-shaped formation, the strip is bent into the form shown in Figure 3 and inserted into the opening provided in the base member, as shown in Figure 4. The line of division 17 is positioned adjacent the valley 14 in the heart opening and the free ends 18 of the strip are so arranged as to abut against the point 13 of the heart-shaped opening, as shown more particularly in Figure 5. The base member is positioned upon a flat surface S which may be either a baking or cooling surface, and the container forming strip B is telescoped through the opening in the base member until the lower edge of the strip rests upon the heating or cooling surface S. The raw product in liquid, plastic or semi-solid form is then placed within the container forming strip and the product heated, cooled or otherwise processed to solidify the same.

The base member A and container forming strip B, shown in Figures 1 and 2, may be made of a variety of different sheet materials which may be found most convenient for the purpose. When a long wearing apparatus is desired, it may be found preferably to make the same of metallic material, such as iron, steel or aluminum, commonly used for baking apparatus. It has been found, however, that where the baking temperature is not too high, ordinary paperboard may be used for the purpose. For the baking of cakes, pastries, pies and other products under normal temperature conditions of approximately 400° F., paperboard has been found a lasting and effective material. Paperboard recommends itself in that the apparatus can be made at extremely low cost and can be so easily given the desired shape by merely cutting out an opening in the base forming blank. The container forming strip should be formed of paperboard which is sufficiently resilient and flexible to conform to the inside contour of the opening cut in the base member. The base member should be formed of sufficiently strong and rigid material to properly support and retain the container forming strip in proper shape.

The raw product O which may be batter or similar material, is poured from a vessel P, as shown in Figure 5, directly into the container forming strip B positioned upon the heating or cooling surface S. The product is then solidified by cooling or heating at the proper temperature. When the heating and cooling processing operation has been completed, the container forming strip is lifted directly off from the base member, or if found preferable, the base member may be lifted off from the container forming strip. The container forming strip can be easily and quickly peeled from the finished product C by grasping the free ends 18 of the strip and pulling the same laterally therefrom, as shown in Figure 7. If desired, the container forming strip may be provided with a waxed liner or other coated surface 19 to prevent the finished product from adhering to the strip, and to facilitate removal thereof.

By means of the simple apparatus above disclosed, any variety of irregular shaped products may be quickly and inexpensively formed. There is shown in Figure 9 for purposes of illustration, a base member, the top wall 10 of which is provided with a plurality of crescent shaped openings. The container forming strip, such as shown in Figure 2, is inserted within each opening, with the division line 17 positioned at the point of one of the crescents and the free ends 18 of the strip positioned at the other point. The raw material is placed within the strip and properly processed. It is understood that the base member may be provided with one or more forming openings as found convenient or desirable. Similarly, the container forming strip may be provided with one or more division lines 17 depending upon the shape to be formed, all of which is evident to those skilled in the art. For example, if a star-shaped product is to be made a strip having a line of division 17 for each point and valley of the star, except one, would be provided. It is also understood that two or more strips may be used rather than one if found more convenient.

It is now seen that the apparatus above disclosed for forming irregular shaped products may be very inexpensively made. If paper material is used, the forming openings may be cut out from a sheet of paperboard at very little cost. The apparatus may be supplied at such low cost as to make the additional cost of products having irregular contours almost negligible. Since the base member and container forming strip are separable and formed of flat sheets, the same may be easily cleansed for reuse if desired. If paperboard is used, it may be found that the form may be discarded with economy after a single use. A large variety of different products may be formed with the apparatus herein disclosed.

While certain novel features of the invention have been disclosed and are pointed out in the annexed claims, it will be understood that various omissions, substitutions and changes may be made by those skilled in the art without departing from the spirit of the invention.

What is claimed is:

1. A form for shaping baked products comprising a base frame, said frame including a top wall and supporting side walls adapted to rest on the baking surface, said top wall having an opening therein shaped to resemble the contour of the product to be formed, and a strip of material removably positioned within said opening and providing a retaining wall within which the product is baked.

2. A form for baking edible products comprising a base frame having a wall with an opening therein shaped to resemble the contour of the product to be formed, and a side wall member comprising a strip of paperboard material positioned within said opening and bent to conform thereto, said strip being held in container forming position by said frame.

3. A form for shaping baked products comprising a base frame including a top wall and supporting side walls adapted to rest on the baking surface, said top wall having an opening therein shaped to resemble the contour of the product to be formed, and a side wall member positioned within said opening to provide a container within which the product is baked, said member comprising a resilient strip of material bent to conform to said opening and removably held in container forming position by said frame.

4. A form for shaping baked products comprising a base frame, said frame comprising a top wall and supporting side walls adapted to rest on the baking surface, said top wall having an opening therein shaped to resemble the contour of the product to be formed, and a side wall member removably positioned within said opening to provide a container within which the product is baked, said member comprising a resilient strip of material bent to conform to said opening and removably held in container forming position by said frame.

5. An apparatus for baking crescent-shaped products comprising, a base frame of paperboard material, said frame including a top wall and supporting side walls, said top wall having an opening therein crescent-shaped to resemble the contour of the product to be formed, and a resilient strip of paperboard material positioned within said opening to provide a retaining side wall within which the product is baked, said strip being bent to conform to said opening and removably held in container forming position by said frame.

HARVEY T. BOWMAN.
J. ALBERT BUSER.